July 11, 1950  E. E. MILLS  2,515,093
MACHINE FOR MAKING HOLLOW ARTICLES
Filed Oct. 3, 1949  3 Sheets-Sheet 1

Inventor
ELMER E. MILLS
By
Attorney

July 11, 1950   E. E. MILLS   2,515,093
MACHINE FOR MAKING HOLLOW ARTICLES
Filed Oct. 3, 1949   3 Sheets-Sheet 2

Inventor
ELMER E. MILLS
By
Attorney

July 11, 1950 E. E. MILLS 2,515,093
MACHINE FOR MAKING HOLLOW ARTICLES
Filed Oct. 3, 1949 3 Sheets-Sheet 3

Inventor
ELMER E. MILLS
By
Attorney

Patented July 11, 1950

2,515,093

UNITED STATES PATENT OFFICE 2,515,093

MACHINE FOR MAKING HOLLOW ARTICLES

Elmer E. Mills, Highland Park, Ill.

Application October 3, 1949, Serial No. 119,335

6 Claims. (Cl. 18—5)

1

This invention relates in general to a machine for fabricating hollow articles, such as containers and particularly bottles, substantially automatically from a tube of thermo-plastic material.

Persons acquainted with the machinery and methods presently in use for manufacturing containers from thermo-plastic material are well aware of the costliness and the complicated character of the machinery. It is also a well known fact that the speed of production of containers, even when using such costly and complicated machinery, is relatively slow at best.

Accordingly, a primary object of my invention is the provision of an improved machine for fabricating hollow articles, such as containers, from a thermo-plastic material, which machine is much less expensive and much less complicated than presently known machines for the same purposes.

A further object of this invention is the provision of an improved machine for fabricating hollow articles, as aforesaid, whereby a much greater output can be accomplished with less cost and less difficulty than is experienced with presently known types of methods and machines for this purpose.

A further object of this invention is the provision of a machine for fabricating hollow articles, as aforesaid, which can be combined substantially directly with a molding machine, such as of the extrusion type, for producing thermo-plastic tubing of an appropriate size.

A further object of this invention is the provision of a machine for fabricating hollow articles, as aforesaid, whereby a thermo-plastic tubing is fed into said machine while in a softened condition and is formed into said articles completely automatically.

Further objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a movable platform, such as a circular table rotatable in a horizontal plane, having a plurality of mold halves in vertically opposed pairs supported thereon, said mold pairs being disposed closely adjacent to each other and preferably entirely around the periphery of the table. The upper mold half of each complete mold, which is vertically actuable toward and away from the lower mold half, is provided with a hollow needle ex-

2 tending into a mold cavity defined by the mold halves. Thus, when a thermo-plastic tube is disposed between a pair of said mold halves, and the upper mold half is lowered into engagement with the lower mold half, that portion of the tubing disposed within said mold cavity is sealed at both ends thereof, thereby forming a sealed chamber, and said needle enters said chamber. A fluid under pressure is then forced through the needle and into said chamber thereby expanding the tube against the walls of the mold. The mold is held in the closed position and the fluid pressure is maintained until the thermoplastic has been appropriately cooled and set. The fluid pressure is then released, the mold is opened, and the formed plastic article may be removed therefrom.

For illustrations of a preferred embodiment of my invention, attention is directed to the accompanying drawings in which.

Construction

Figure 1:
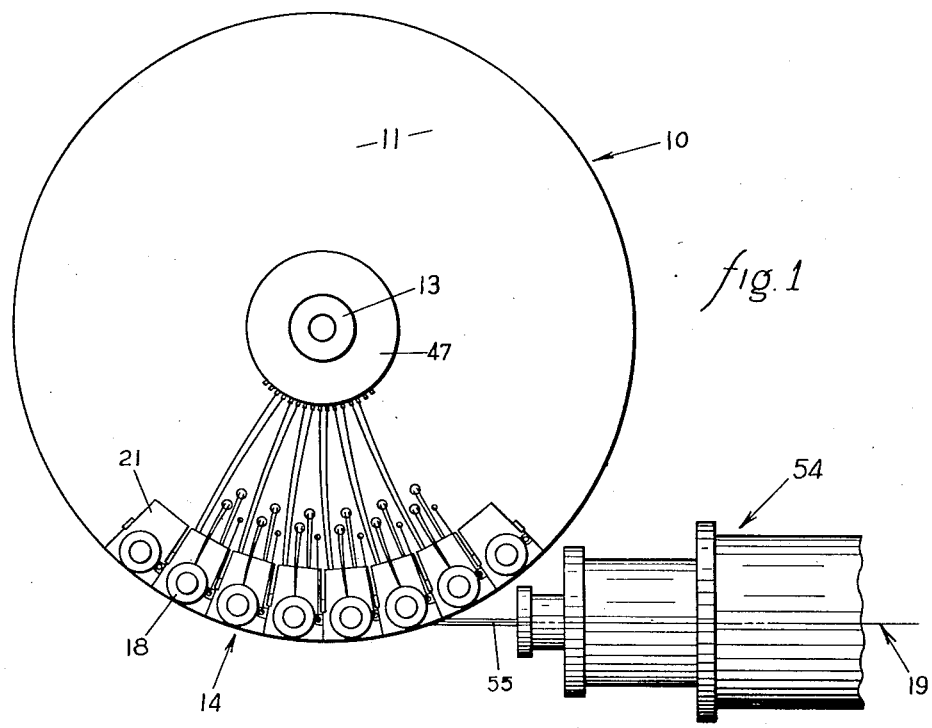
Figure 1 is a fragmentary, top plan view of the machine to which this invention relates and shows a fragment of a plastic extruding machine.
Figure 2:
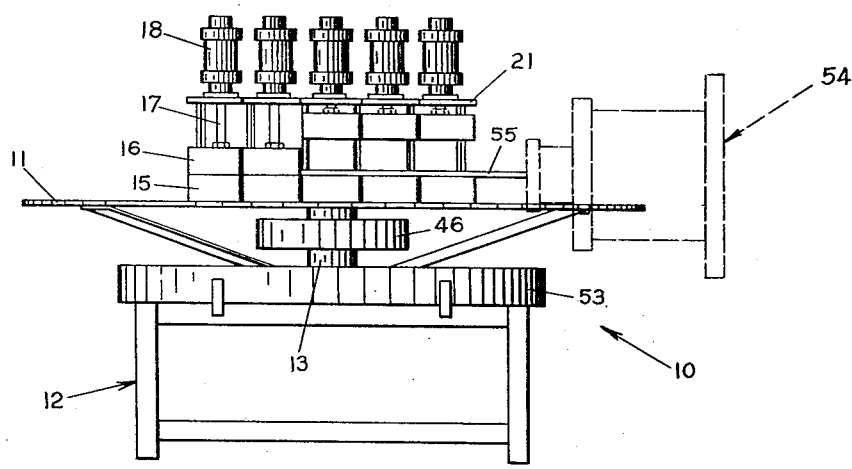
Figure 2 is a side elevation view of the said machine shown in Figure 1.

As shown in Figures 1 and 2, the molding machine 10 to which the invention relates, is comprised in the particular embodiment here selected for illustrating my preferred machine, of a flat, horizontal, circular table 11 rotatably supported at the center thereof upon the pedestal 12, by means of the center post 13. A plurality of molds 14, arranged in vertically opposed halves, are mounted upon the top of the table 11 closely adjacent to each other and preferably along the periphery of the table.

Figure 4:
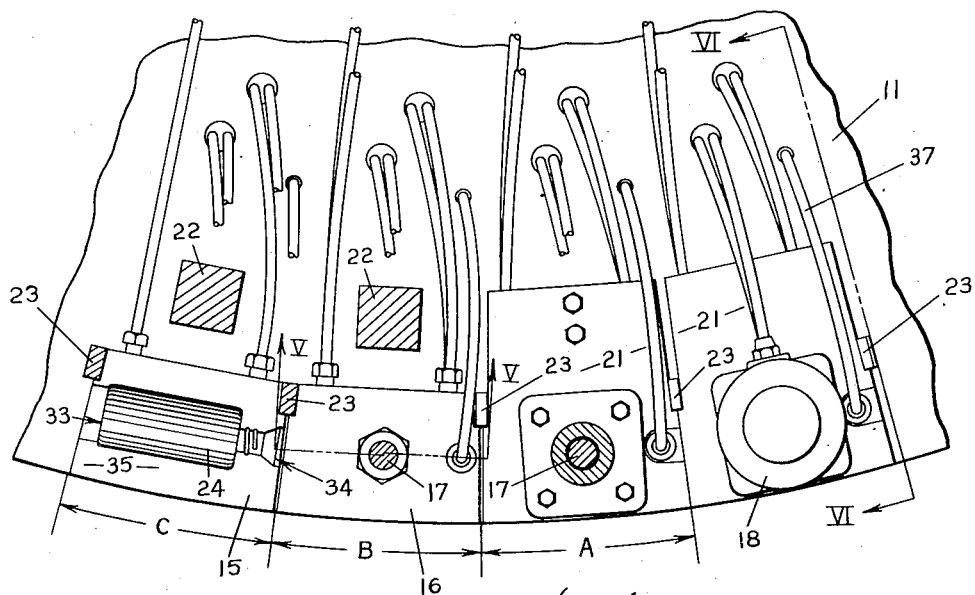
Figure 4 is a fragmentary, top plan view of a portion of my machine showing four sets of molds, three sets of which are sectioned along the cutting lines A—A, B—B, and C—C as shown in Figure 3.
Figures 3, 5:
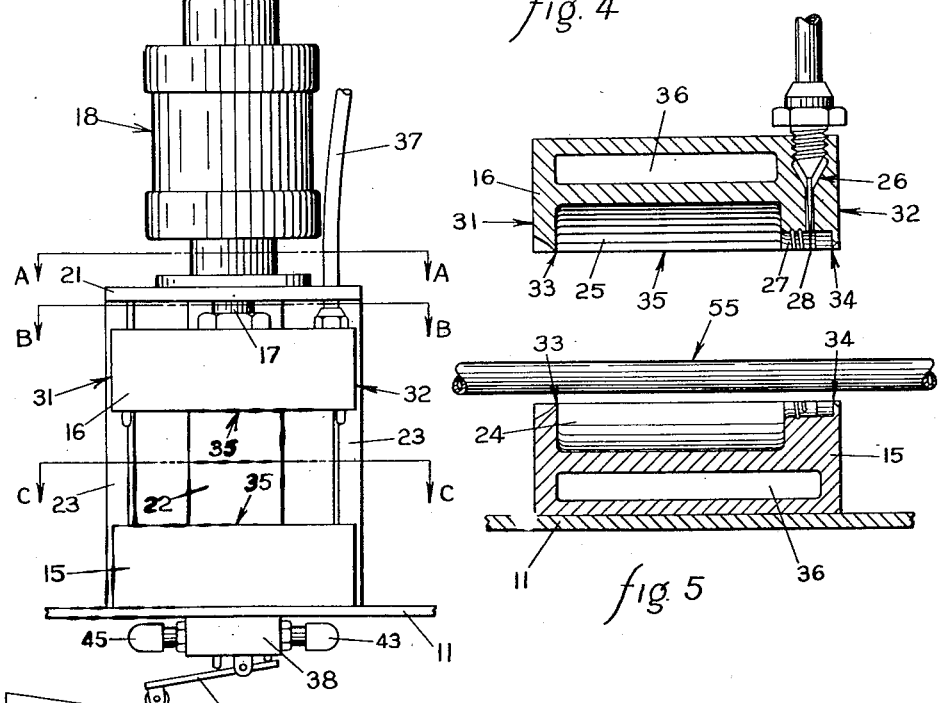
Figure 3 is a side elevation view of a pair of mold halves, and means including an actuating cylinder and a cam actuable valve, for controlling the vertical movement of the upper mold half.
Figure 5 is a cross-sectional view of an open mold substantially as taken along the line V—V of Figure 4.
Figure 6:
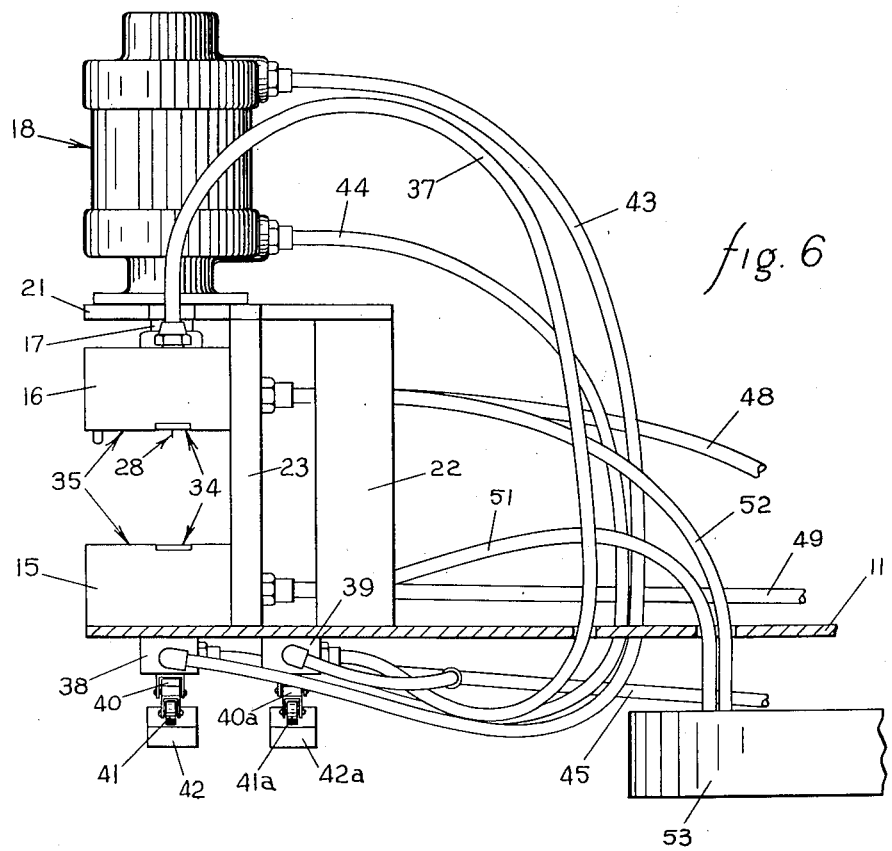
Figure 6 is a sectional view substantially as taken along the line VI—VI of Figure 4 and showing a side elevation view of a mold and means for actuating the upper mold half.

Each mold 14 (Figures 3, 4 and 6), has a lower mold half 15, secured to the table, and an upper mold half 16 vertically movable toward and away from the lower mold half 15. The upper mold half 16 is secured to and suspended from the lower end of an actuating rod 17 of an actuating cylinder 18, which cylinder may be supported above the lower mold half 15 by any convenient conventional means, such as the support plate 21 and support post 22.

For the purpose of convenience in description, the terms "inwardly" and "outwardly" as used in this specification shall be understood to have reference to the geometric center of the machine 10. The terms "upper" and "lower" or "upwardly" and "downwardly" shall be understood to refer to the said machine 10, or parts thereof, when positioned and/or operating in their normal manner of use.

It will be clearly understood that the actuating cylinder 18, described as the means for moving the upper mold half with respect to the lower mold half, is herein so described for illustrative purposes only, and that other similar actuating devices may be used in place of the actuating cylinder 18 without departing from the scope of this invention.

A pair of vertical guide bars 23 are disposed at the lateral ends 31 and 32 of each mold for guiding the movement of the upper mold half 16. The guide bars 23 are secured to and extend between the lower mold half 15 and the support plate 21.

Figure 7:
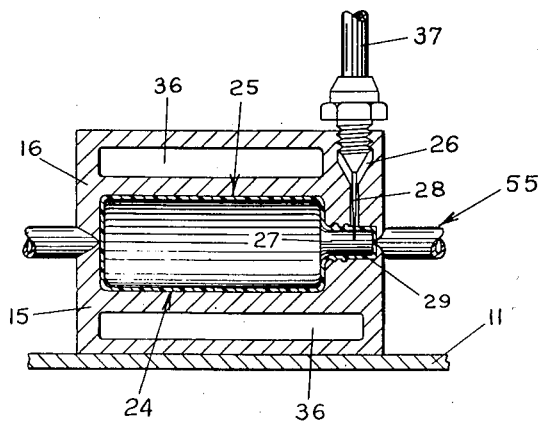
Figure 7 is a sectional view of a closed mold substantially as taken along the line V—V of Figure 4.

The upper and lower mold halves 16 and 15, respectively, may be each provided with opposing mold cavities 24 and 25 (Figures 5 and 7), which in this particular embodiment of this invention are designed to form a bottle. The upper mold half 16 is provided with an opening 26 therethrough, which communicates between the outside surface of the mold block and the mold cavity 25 above the bottle neck portion 27 thereof. A hollow needle 28, such as a hypodermic needle, is disposed within the opening 26 and extends into the mold cavity 25, so that it pierces the extension 29 of the bottle neck, which extension is later removed.

The lateral ends 31 and 32 of both the upper and lower mold halves are beveled adjacent to the mold cavities to form the jaws or sharp edges 33 and 34 (Figure 5), which jaws or edges may be in some instances, but are not necessarily, slightly recessed from the adjacent meeting surfaces 35 of the mold halves, for reasons hereinafter disclosed. The lower and upper mold halves 15 and 16, respectively, are each provided with fluid chambers 36 whereby the temperature of the mold may be controlled.

Any convenient conventional means, such as the flow control valves 38 and 39, which are preferably mounted upon the underside of the table 11 (Figures 3 and 6), are provided for controlling the actuation of the cylinder 18 and the supply of fluid to the needle 28, respectively, of a single mold 14. The valves 38 and 39 which, as herein shown, have pivoted rocker arms 40 and 40a, respectively, rotatably supporting rollers 41 and 41a at one end of each, are preferably radially aligned with respect to the table 11. The rollers 41 and 41a are engageable by cams 42 and 42a, respectively, of any appropriate type, for actuating said valves 38 and 39. The valves 38 and 39 are supplied with a fluid, either liquid or gas, through a supply tube 45 from a lower plenum chamber 46 (Figure 2) mounted upon the center post 13 below the table 11.

The upper end of the needle 28 is connected, by means of the fluid tube 37, which passes through an appropriate opening in the table 11, to the flow control valve 39. The actuating cylinder 18 may be connected to the flow control valve 38 by means of the fluid tubes 43 and 44, which pass through an appropriate opening in the table 11.

The fluid chambers 36 in the mold halves 15 and 16 are connected to an upper plenum chamber 47, which is mounted upon the center post 13 above the table 11 (Figure 1), by means of the fluid tubes 48 and 49. Said fluid chambers 36 in the mold halves 15 and 16 are also provided with drain tubes 51 and 52 which pass therefrom through an appropriate opening in the table 11 and extend into a drain pan 53 (Figures 2 and 6) supported upon the pedestal 12 beneath the table 11. Means, such as a suction pump (not shown), may be provided for transferring the temperature controlling fluid, such as heating oil or cooling water, from the drain pan 53 under pressure into the upper plenum chamber 47.

The flow control valves 38 and 39 and the cams 42 and 42a are preferably designed and arranged so that the valve 38, which controls the fluid flow to the cylinder 18, is actuated first thereby effecting a closure of the mold. After such closure is completed, the valve 39 is then actuated which causes fluid, such as a gas, to pass through the needle 28. It will be recognized that the fluid flowing through the valves 38 and 39, and through the fluid chambers 36 may be either a gas or a liquid within the scope of this invention.

*Operation*

As shown in Figures 1 and 2, the molding machine 10 may be placed near any convenient source of softened plastic tubing 55, such as the output end of a plastic extrusion machine 54. The molding machine 10 is preferably positioned so that the lateral center line of the mold cavity, formed by one mold 14, is substantially co-axial with the longitudinal axis 19 of the extrusion machine 54. When the extrusion machine 54 is so disposed, as shown in Figure 1, the table 11 is rotated in the clock-wise direction, or away from the output end of the extruder and the peripheral velocity of the table is synchronized with the output speed of the extruder.

Any convenient guiding means, not shown, such as a guide tube co-axially surrounding the extruded tube 55, may be provided to control the travel of said extruded tube 55 along a desired path and thereby maintain its proper position with respect to the successive molds.

The plastic tube 55 is caused to rest upon the sharp edges 33 and 34 at the opposite lateral ends of the lower mold half 15 (Figure 5) of a particular mold 14 as said mold reaches the point of tangency on the table with respect to the axis 19 of the extruder 54. At approximately this moment the upper mold half 16 is urged downwardly, by appropriate actuation of the valve 38, until it is closed tightly against the lower mold half. The sharp edges 33 and 34, of both the upper and lower mold halves compress the tube 55 almost to the point of cutting it, thereby providing a sealed chamber within that portion of said tube disposed within the mold cavities 24 and 25 and between the sharp edges 33 and 34. As the upper mold half closes upon the lower mold half, the lower end of the needle 28 pierces the wall of the tube 55 and enters said sealed chamber therewithin. Thus, upon the appropriate actuation of the valve 39 a fluid, either gas or liquid, is forced through the needle 28 into the sealed chamber, thereby expanding the tube against the inside walls of the respective mold cavities (Figure 7) and forming a molded article, which in this case is a bottle.

The movement of the upper mold half into engagement with the lower mold half is preferably accomplished while the mold lateral axis is substantially coincident with the center line 19 of the extruder 54. However, the injection of the fluid into the sealed portion of the tube 55 may occur after the mold has moved in a clock-wise direction away from said tangential position.

If the plastic tube 55 is fabricated in the extruder 54 from a thermoplastic, it is warm and soft as it feeds into the molds 14 on the machine 10. Therefore, after it has been shaped to the mold cavities, and before the fluid pressure within the tube is released, a coolant, such as water, is circulated through the chambers 36 of both the upper and lower mold halves by means of the fluid tubes 48 and 49 and the drain tubes 51 and 52, thereby causing the thermo-plastic to set in the shape of the mold cavities. The fluid pressure within the molded article may then be released, the upper mold half 16 may be raised and the molded article removed from the mold.

It will be observed in this embodiment that by failing to make a complete cut of the plastic tubing between the sharp edges 33 and 34, successive molded articles will be connected by short lengths of the plastic tube 55 thus facilitating the manual removal of the articles from the molds 14. It will be recognized, however, that if it becomes desirable to use automatic means for removing the molded articles from the molds, the sharp edges 33 and 34 may be made flush with the contacting faces 35 of each mold so as to effect a complete cutting of the tube 55 when the upper mold half is brought into engagement with the lower mold half.

The fluid used to expand the tube against the walls of the mold cavity may be either an inert gas, such as air, or an inert liquid, or it may be a fluid having some treating effect on the plastic, such as a hardening agent, or a coating or coloring material.

The composition of the plastic tubing has been herein referred to as "thermo-plastic" primarily because presently known types of thermo-setting plastics are not suitable to the type of operation above described. However, it will be clearly understood that this invention is not limited to the use of thermo-plastic materials as such, and that the term "thermo-plastic" as used in the present specification and claims shall refer to any material having generally the necessary plasticity characteristics.

It will be apparent to those familiar with the operation and use of plastics that the exact timing of the introduction of a coolant into the fluid chambers 36 of the mold and the amount of pressure required and the length of time for applying such pressure within the sealed chamber of the tube in the mold cavities will depend upon the type of plastic material used as well as the condition of the plastic as it leaves the extruder. However, any such variations are to be considered within the scope of this invention.

It will also be apparent that the molds may be arranged for linear movement, such as by means of a conveyor belt, without departing from the scope of the invention.

Although the above mentioned drawings and description apply to one particular embodiment of the invention, it is not my intention, implied or otherwise, to eliminate other variations or modifications which do not depart from the scope of the invention unless specifically stated to the contrary in the hereinafter appended claims.

I claim:

1. In an apparatus for making hollow, plastic articles, the combination comprising: means for continuously supplying softened, plastic, tubular material; a plurality of continuously moving, sectional molds, each successively alignable with said tubular material; means for clamping each of said molds about said tubular material as each of said molds becomes substantially aligned with said tubular material; a jaw at each end of each of said molds for collapsing said tubular material and sealing said tubular material against the passage of a fluid at each end of each said mold; a hollow needle associated with each said mold intermediate said jaws for piercing said tubular material and for admitting a fluid under pressure into the portion of said tubular material clamped within each said mold after said jaws have sealed said tubular material.

2. In an apparatus for making hollow, plastic articles, the combination comprising: means for continuously supplying softened, plastic, tubular material; a plurality of continuously moving, sectional molds, each successively alignable with said tubular material; means for clamping each of said molds about said tubular material as each of said molds becomes substantially aligned with said tubular material; a pair of cooperating jaws at each end of each of said molds for collapsing said tubular material and sealing each end of that portion of said tubular material in each said mold against the passage of a fluid; means associated with each said mold intermediate said pairs of jaws for piercing said tubular material when each said mold is clamped together for admitting a fluid under pressure into the portion of said tubular material clamped within each said mold after said jaws have sealed the ends of said portion of tubular material.

3. In an apparatus for making hollow, plastic articles, the combination comprising: means for continuously supplying softened, plastic, tubular material; a plurality of continuously moving, sectional molds, each successively alignable with said tubular material; means for clamping each of said molds about said tubular material as each of said molds becomes substantially aligned with said tubular material; a jaw at each end of each of said molds for collapsing said tubular material and sealing each end of that portion of said tubular material in each said mold against the passage of a fluid; a hollow needle mounted on one section of each said mould intermediate said jaws for piercing said tubular material when each said sectional mold is clamped together for admitting a fluid under pressure into the portion of said tubular material clamped within each said mold after said jaws have sealed the ends of said portion of tubular material.

4. In an apparatus for making hollow, plastic articles, the combination comprising: means for continuously supplying softened, plastic, tubular material; a plurality of continuously moving, sectional molds, each successively alignable with said tubular material; means for clamping each of said molds about said tubular material as each of said molds becomes substantially aligned with said tubular material; a pair of jaws at each end of each of said molds for collapsing said tubular material and sealing each end of that portion of said tubular material in each said mold against the passage of a fluid; a hollow needle associated with each said mold intermediate said pairs of jaws for piercing said tubular material and for admitting a fluid under pressure into the portion of said tubular material clamped within each said mold after said pairs of jaws have sealed said portion of said tubular material.

5. In an apparatus for making hollow, plastic articles, the combination comprising: means for continuously supplying softened, plastic tubular material; a plurality of molds each including a pair of mold halves; means for continuously moving and successively aligning each of said molds with said tubular material; means for clamping said mold halves together about said tubular material as each of said molds becomes aligned with said tubular material; a jaw at each end of each of said molds for collapsing said tubular material and sealing said tubular material against the passage of a fluid at each end of each said mold; a hollow needle associated with each said mold intermediate said jaws for piercing said tubular material and for admitting a fluid under pressure into the portion of said tubular material clamped within each said mold after said jaws have sealed said tubular material.

6. In an apparatus for making hollow, plastic articles, the combination comprising: means for continuously supplying softened, plastic, tubular material; a plurality of molds each including a pair of mold halves; means for continuously moving and successively aligning each of said molds with said tubular material; means for clamping said mold-halves about said tubular material as each of said molds becomes substantially aligned with said tubular material; a jaw at each end of each of said mold halves, the jaws at each end of each of said molds aligned as a pair for collapsing said tubular material and sealing said tubular material against the passage of a fluid at each end of the portion of the tubular material within said mold; a hollow needle associated with each said mold intermediate said jaws for piercing said tubular material and for admitting a fluid under pressure into the portion of said tubular material clamped within each said mold after said jaws have sealed said tubular material.

ELMER E. MILLS.

REFERENCES CITED

The following references are of record in the file of this patent:

UNITED STATES PATENTS

| Number | Name | Date |
|---|---|---|
| 1,863,339 | Humphrey | June 14, 1932 |
| 2,175,054 | Ferngren et al. | Oct. 3, 1939 |
| 2,331,630 | Rempel | Oct. 12, 1943 |
| 2,331,702 | Kopitke | Oct. 12, 1943 |
| 2,345,977 | Howald et al. | Apr. 4, 1944 |
| 2,349,176 | Kopitke | May 16, 1944 |
| 2,354,029 | Kingston | July 18, 1944 |
| 2,401,564 | Hofmann | June 4, 1946 |

OTHER REFERENCES

"Modern Plastics," The Blowing of Plastics, Oct. 1943, pages 96 and 97.